United States Patent
Oka et al.

(10) Patent No.: US 7,437,267 B2
(45) Date of Patent: Oct. 14, 2008

(54) SEWAGE INFLOW AMOUNT PREDICTING DEVICE AND METHOD, AND SERVER DEVICE

(75) Inventors: Toshiaki Oka, Tokyo (JP); Hiroaki Tsutsui, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 10/399,295

(22) PCT Filed: Jul. 16, 2002

(86) PCT No.: PCT/JP02/07214

§ 371 (c)(1),
(2), (4) Date: Aug. 12, 2003

(87) PCT Pub. No.: WO03/008720

PCT Pub. Date: Jan. 30, 2003

(65) Prior Publication Data
US 2004/0044475 A1 Mar. 4, 2004

(30) Foreign Application Priority Data

Jul. 16, 2001 (JP) .............................. 2001-215860

(51) Int. Cl.
*B01D 21/00* (2006.01)
*G06F 19/00* (2006.01)
(52) U.S. Cl. ............................. 702/181; 702/2; 702/45; 702/179; 210/87
(58) Field of Classification Search ...................... 702/2, 702/45, 50, 55, 179, 181–183; 210/87; 73/195, 73/861.01
See application file for complete search history.

(56) References Cited

U.S. PATENT DOCUMENTS

| | | | |
|---|---|---|---|
| 4,150,683 A | | 4/1979 | Simon |
| 4,926,364 A | * | 5/1990 | Brotherton .................. 702/179 |
| 5,198,989 A | * | 3/1993 | Petroff ........................ 702/48 |
| 5,448,476 A | * | 9/1995 | Kurokawa et al. ............. 702/2 |
| 6,303,027 B1 | | 10/2001 | Nagaiwa et al. |
| 6,474,153 B1 | * | 11/2002 | Yamanaka et al. ....... 73/170.17 |
| 6,757,623 B2 | * | 6/2004 | Schutzbach et al. .......... 702/45 |
| 6,807,494 B2 | * | 10/2004 | Schutzbach et al. .......... 702/45 |

FOREIGN PATENT DOCUMENTS

| | | | |
|---|---|---|---|
| JP | 05-134715 A | | 6/1993 |
| JP | 05134715 A | * | 6/1993 |
| JP | 09204218 A | * | 8/1997 |

(Continued)

OTHER PUBLICATIONS

Merriam-Webster's Collegiate Dictionary, "predict". p. 915. 2001.*

*Primary Examiner*—Jeffrey R West
(74) *Attorney, Agent, or Firm*—Blakely, Sokoloff, Taylor & Zafman

(57) ABSTRACT

A case base (54) is generated from historical data containing inflow data (31) that indicates a sewage inflow measured at a sewage treatment plant (10) and meteorological data (33) corresponding to the inflow data (31). A similar case search section (56) and output estimation section (57) predict a sewage inflow corresponding to an input prediction condition (40) after a predetermined prediction time in real time using the case base (54) and output inflow prediction data (20).

3 Claims, 14 Drawing Sheets

FOREIGN PATENT DOCUMENTS

| | | | |
|---|---|---|---|
| JP | 2000-087433 A | 3/2000 | |
| JP | 2000087433 A * | 3/2000 | |
| JP | 2000-194742 | 7/2000 | |
| JP | 2001-174571 | 6/2001 | |
| JP | 2001055763 | 6/2001 | |
| JP | 2001174571 A * | 6/2001 | |

* cited by examiner

HISTORICAL DATA

| x1 | x2 | Y |
|---|---|---|
| 20.8 | 67.3 | 83.2 |
| 21.4 | 68.5 | 80.0 |
| 23.8 | 64.5 | 56.2 |
| 22.9 | 61.4 | 45.4 |
| : | | |

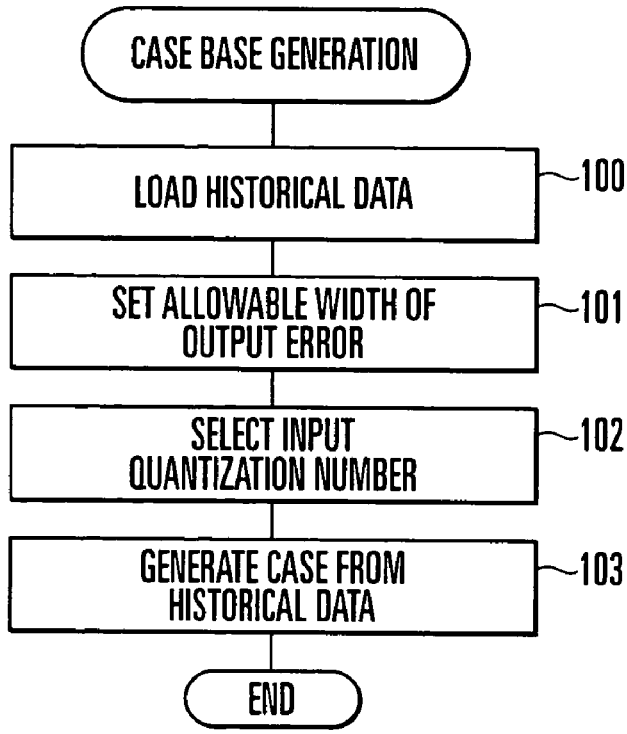
F I G. 6
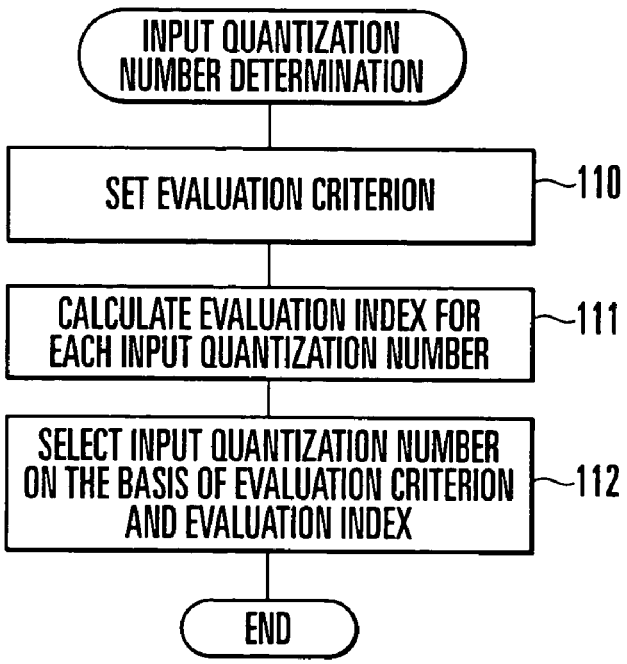
F I G. 7

SET OF DATA IN SAME MESH

| x1 | x2 | y |
|---|---|---|
| 21.6 | 67.5 | 82.3 |
| 21.8 | 69.6 | 81.1 |
| 21.9 | 68.7 | 80.7 |

INPUT VALUE OF CASE IS MEDIAN OF MESH

CASE GENERATED BY INTEGRATION

| x1 | x2 | y |
|---|---|---|
| 21.8 | 68.5 | 81.3 | ps
SEWAGE INFLOW AMOUNT PREDICTING DEVICE AND METHOD, AND SERVER DEVICE

TECHNICAL FIELD

The present invention relates to a sewage inflow prediction apparatus and method of predicting a sewage inflow to sewage treatment facilities, and a server apparatus.

A sewage treatment plant purifies incoming sewage by microbiological treatment. Normally, since microbiological treatment very slowly progresses, it must efficiently be done on the basis of the inflow. Hence, it is very important for the sewage treatment plant to accurately predict the sewage inflow. Conventionally, to predict the sewage inflow, formulas using physical laws are created on the basis of rough values of city design information, e.g., the sewage pipe network structure, topography, and population in the region around the sewage plant. The sewage inflow is predicted using the formulas.

Since the conventional sewage inflow prediction technique uses formulas based on the physical laws, a number of factors are necessary for obtaining an accuracy. However, factors usable in formulas are limited as a matter of course. In addition, since rough city design information is used, the sewage inflow cannot be accurately predicted. For example, sewage includes house drainage, industrial wastewater from plants, and rainwater. The sewage inflow varies due to the influence of many factors such as rainfall, specific days (holidays), and seasonal changes as well as social changes (e.g., an increase/decrease in population or the number of plants) around the sewage plant. Furthermore, since the sewage pipe network in a city is very complex, these factors can hardly be accurately expressed by formulas using physical laws.

DISCLOSURE OF INVENTION

The present invention has been made to solve the above problems, and has as its object to provide a sewage inflow prediction apparatus and method capable of accurately predicting a sewage inflow to a sewage treatment plant, and a server apparatus.

BRIEF DESCRIPTION OF DRAWINGS

FIG. 6 is a flow chart showing case base generation processing;

FIG. 7 is a flow chart showing input quantization number determination processing;

BEST MODE FOR CARRYING OUT THE INVENTION

[Arrangement of Sewage Inflow Prediction Apparatus]

The embodiment of the present invention will be described next with reference to the accompanying drawings.

Figure 1:
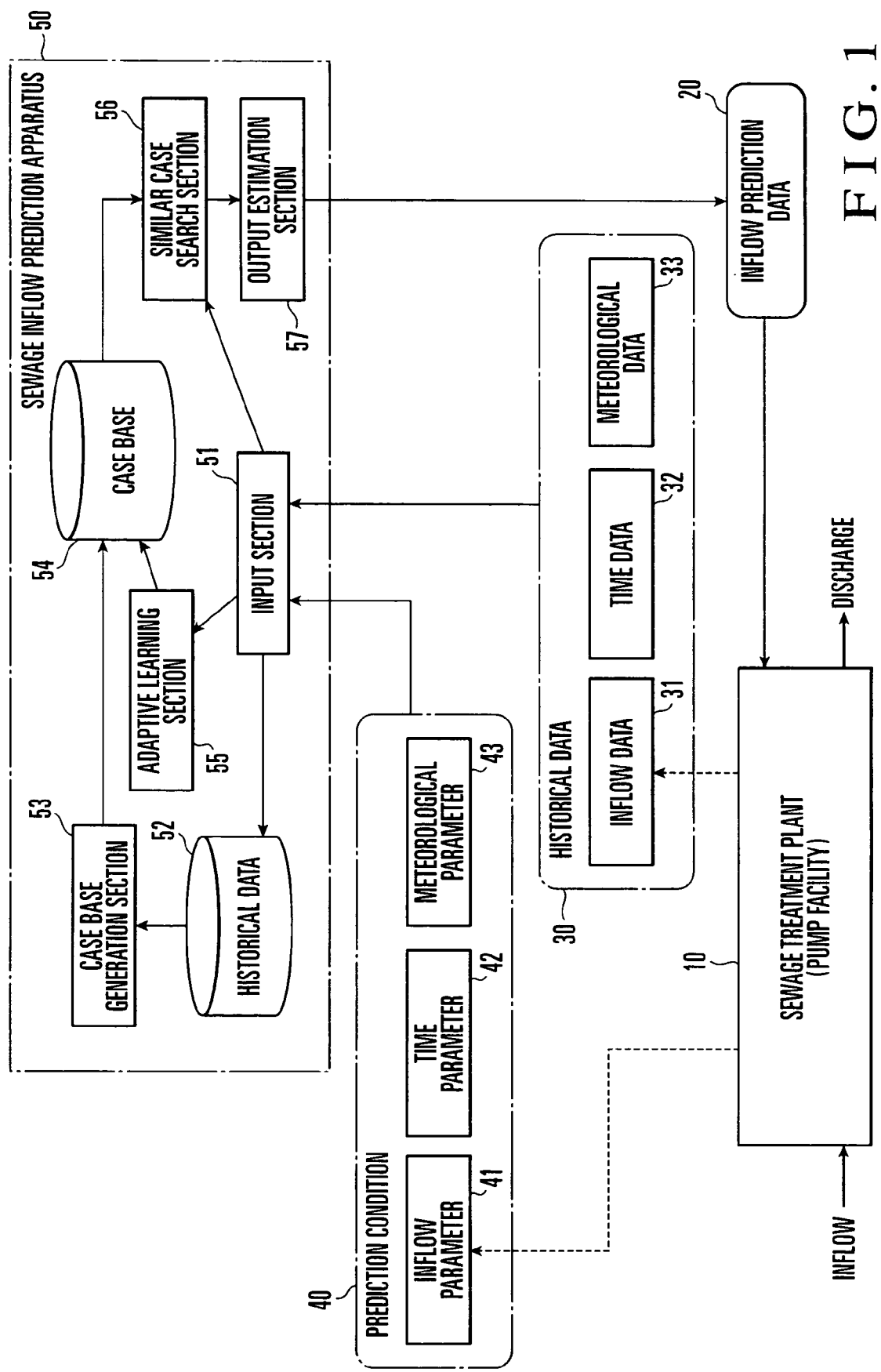
FIG. 1 is a block diagram showing a sewage inflow prediction apparatus according to an embodiment of the present invention.

FIG. 1 is a block diagram showing a sewage inflow prediction apparatus according to an embodiment of the present invention. An example wherein an incoming sewage inflow is predicted in a sewage treatment plant which purifies sewage including house drainage, industrial wastewater from plants, and rainwater by microbiological treatment and discharges the purified water to rivers will be described. The present invention can be applied not only to a sewage treatment plant but also to predict a sewage inflow to sewage treatment facilities that receive sewage, e.g., pump facilities provided upstream a sewage treatment plant.

A sewage treatment plant 10 has facilities including a settling basin where sediments are removed from wastewater flowing from soil pipes (sewage pipes), a first sedimentation basin where suspended matters contained in the wastewater from the settling basin sediment over several hrs, an aeration tank where activated sludge containing microbes is added to the supernatant liquid obtained in the first sedimentation basin, and aerated to perform microbiological treatment, a final sedimentation basin where the activated sludge is converted into a spongy form by the treatment in the aeration tank sediments over several hrs, and a sterilization basin where a sterilization liquid such as sodium hypochlorite is injected into the supernatant liquid obtained in the final sedimentation basin to sterilize it. Water treated in the sterilization basin is discharged to a river or sea by a pump.

A sewage inflow prediction apparatus 50 generates a case base on the basis of historical data 30 obtained from the past records, predicts the inflow of sewage that should be received after a predetermined time on the basis of a prediction condition 40 that specifies the predicted inflow, and outputs inflow prediction data 20. In the sewage treatment plant 10, sewage purification treatment is controlled on the basis of the inflow prediction data 20. Note that a black box prediction model is a prediction model which is extracted using a plurality of historical data formed from combinations of input and output values and indicates the input/output relationship between the objects. Hence, the formulas that indicate the input/output relationship between the objects need not be derived using physical laws.

The sewage inflow prediction apparatus 50 is constituted by an input section 51 which receives the historical data 30 and prediction condition 40, a number of historical data 52 formed from the received historical data 30, a case base generation section 53 which generates a case base 54 containing a number of cases using the historical data 52, and a similar case search section 56 which searches the case base 54 for a similar case on the basis of newly input prediction condition 40. The sewage inflow prediction apparatus 50 also has an output estimation section 57 which estimates, from at least one similar case detected by the similar case search section 56, an inflow corresponding to the new prediction condition 40 and outputs the inflow prediction data 20 after, e.g., 60 to 120 min, 24 hrs, etc., and an adaptive learning section 55 which partially revises the case base 54 on the basis of the new historical data 30. Of these components, the case base generation section 53, similar case search section 56, output estimation section 57, and adaptive learning section 55 are implemented by software.

[Operation of Sewage Inflow Prediction Apparatus]

The operation of the sewage inflow prediction apparatus 50 according to this embodiment will be described next with reference to FIG. 1. The sewage inflow prediction apparatus 50 receives the historical data 30 through the input section 51 before inflow prediction and stores the data as the historical data 52. The case base 54 is generated using the historical data 52. As the historical data 30, inflow data 31, time data 32, and meteorological data 33 are used. The inflow data 31 indicates the actual inflow such as the 1-hr time inflow or 1-day total inflow measured by the flowmeter in the sewage treatment plant 10.

The time data 32 indicates the time, type of day, and season when the inflow data 31 is obtained. The meteorological data 33 indicates the air temperature, rainfall, and weather at the sewage treatment plant 10 or in the objective region. Of the historical data 30, data measured at the sewage treatment plant 10 are used as the inflow data 31 and time data 32. As for the meteorological data 33, data measured at the sewage treatment plant 10 or in the objective region may be used. Alternatively, past meteorological data may be acquired from a meteorological data provider.

The similar case search section 56 searches for a similar case on the basis of the prediction condition 40 input from the input section 51 using the case base 54 generated on the basis of the historical data 52. The output estimation section 57 estimates an inflow corresponding to the prediction condition 40 from at least one similar case detected by the similar case search section 56 and outputs the inflow prediction data 20 after, e.g., 60 to 120 min. The sewage treatment plant 10 prevents an increase in sewage inflow on the basis of the inflow prediction data 20.

The prediction condition 40 is a variable that specifies the inflow to be predicted by the sewage inflow prediction apparatus 50 and contains an inflow parameter 41, time parameter 42, and meteorological parameter 43. Of these parameters, the inflow parameter 41 corresponds to the inflow data 31. The inflow parameter 41 is formed from record data that indicates the actual inflow such as a time-series inflow or a 1-day total inflow measured by the flowmeter in the sewage treatment plant 10. Recorded data in the past time period of several hours retroactive from the time position (e.g., after 90 min) of the inflow to be predicted is used.

The time parameter 42 corresponds to the time data 32. Pieces of information about time, including day type information representing the type of a day, e.g., a weekday, holiday, day before a holiday, national holiday, the end/beginning of the year, operation day, and season information that indicates the season to which the day belongs, are used independently or in combination. For example, to predict the inflow at noon tomorrow, "noon" is set as time information. If tomorrow is Sunday, "holiday" is set as day type information.

The meteorological parameter 43 corresponds to the meteorological data 33. Information about environments, including air temperature information, weather information, and rainfall information at the time position of the inflow to be predicted, are used independently or in combination. For example, to predict the inflow at noon tomorrow, air temperature at the same time of yesterday, i.e., yesterday noon or predicted air temperature at noon tomorrow may be set. As weather information, predicted weather of tomorrow may be set. As the rainfall information, predicted rainfall of tomorrow may be set.

As the meteorological parameter, a desired parameter is acquired from the provider who provides meteorological data. For example, rainfall is provided every 1 hr from the Meteorological Agency or every 10 min from a river information center. As weather, short-term prediction by the Meteorological Agency or a weather predicted value obtained by a meteorological radar is used. As air temperature, short-term prediction by the Meteorological Agency, data from the AMeDAS for the objective district of the sewage treatment plant, or data measured by a thermometer actually installed in the district is used.

The pieces of individual information used in the historical data 30 or prediction condition 40 are not limited to the above-described information and can appropriately be changed in accordance with the system configuration or required prediction accuracy. For example, an inflow related to the inflow to be predicted, e.g., information about an inflow such as the inflow 24 hrs before the inflow to be predicted or the total inflow of the previous day may be combined. As such inflow information, data received in the past can be used.

Actually, to predict the sewage inflow at time T1, i.e., predetermined time after prediction time T0, the inflow parameter 41 measured before the time T0, the time parameter 42 at the time T1, and the predicted case base generation section 53 at the time T1 are used as the prediction condition 40. Hence, for the historical data 30 to be used to generate the case base 54, time matching/time-series processing is performed whereby inflow data (first inflow data) corresponding to the question of a case experienced in the past (measured before the time T0) and inflow data (second inflow data) corresponding to the answer (measured at the time T1) are generated.

The adaptive learning section 55 individually revises each case of the case base 54 on the basis of the historical data 30 containing the sewage inflow newly measured at the sewage treatment facility. In this circumstance as well, time matching/time-series processing is performed whereby inflow data (fourth inflow data) corresponding to the question of a case experienced in the past (measured before the time T0) and inflow data (third inflow data) corresponding to the answer (measured at the time T1) are generated. As the time data 32 or meteorological data 33, data corresponding to the inflow data as the answer is used.

Of the case base 54, the output values of cases corresponding to the historical data 30 are changed at a predetermined ratio in accordance with the output values of the historical data 30. If no corresponding case is present in the historical data 30, a new case is added to the historical data 30.

In this way, a prediction model is generated from the historical data actually measured at the sewage treatment plant, and sewage inflow prediction data corresponding to a desired prediction condition is estimated using the prediction model. This ensures a practical operability. A future inflow can sufficiently reliably be predicted in consideration of the time required for sewage purification treatment. Hence, as compared to the conventional system, which executes prediction using formulas based on physical laws, the inflow can be predicted using a relatively small number of variables. Rough city design information need not be used.

Especially, when the sewage treatment plant cannot do full treatment because of an abrupt increase in sewage inflow due to, e.g., rainfall, emergency measures must be taken to make a detour of the sewage to another sewage treatment plant or inject a disinfectant such as chlorine to the sewage and discharge it to a river. To do this, operators must be dispatched to a pump facility or disinfectant injection facility distant from the sewage treatment plant. Hence, the necessity of the measures must be determined at an early stage (e.g., 60 min before actually taking such measures). According to the above embodiment, the necessity of the measures can precisely be determined on the basis of the accurately predicted inflow. Even in the above circumstance, appropriate measures can be taken.

An example wherein the case base is used as a black box prediction model has been described above. However, the present invention is not limited to this. For example, a prediction model using a fuzzy reasoning model or neural network may be used. Especially, according to experiments conducted by the present inventors using the case base, the inflow can be predicted at a sufficient accuracy for operation only by using time as the time parameter, air temperature and rainfall as the meteorological parameters, and using these parameters and the actual sewage inflow value, so the sewage inflow can be predicted at a practical accuracy.

[Configuration of Sewage Inflow Prediction Data Broadcast System]

Figure 2:
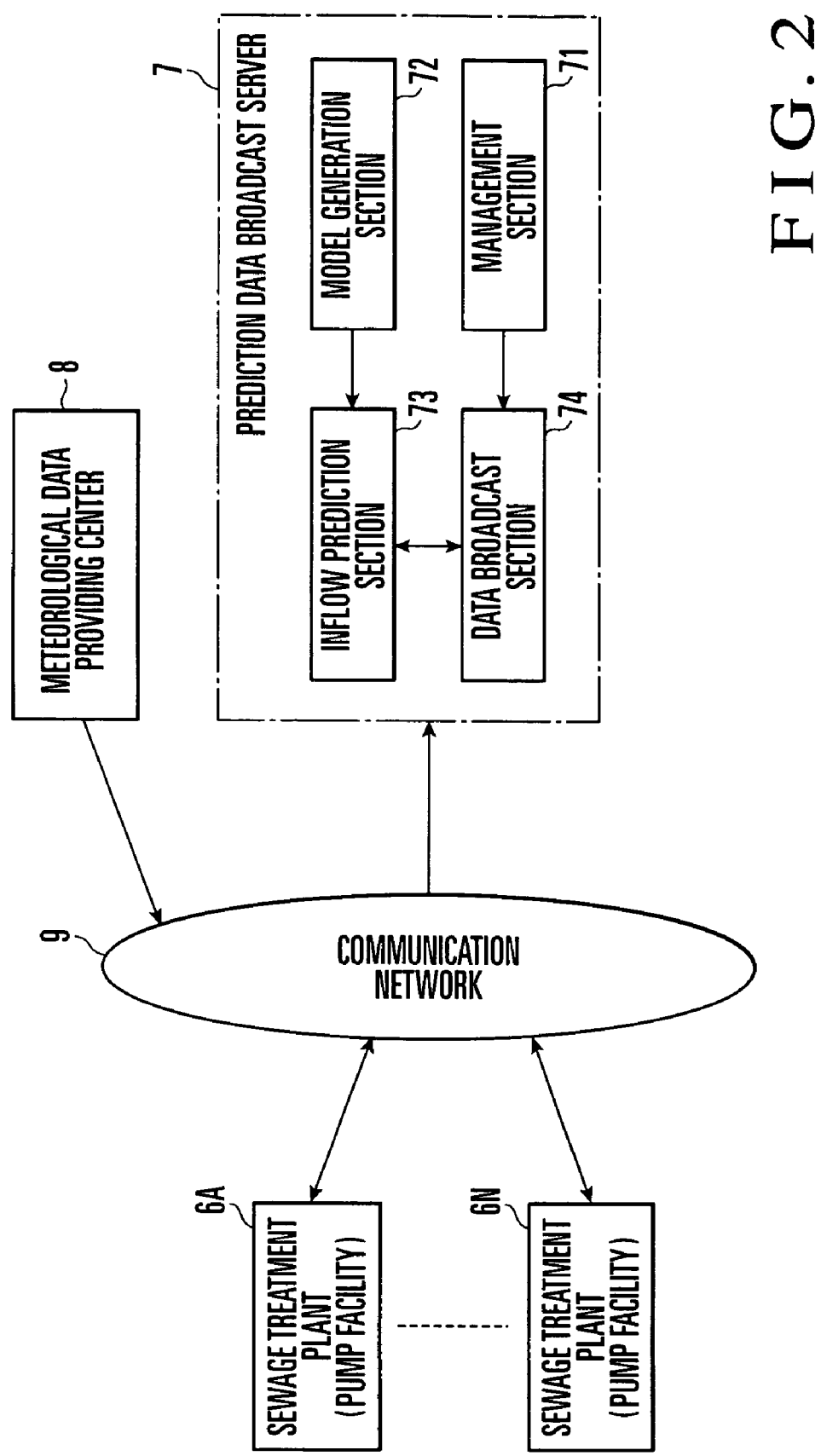
FIG. 2 is a block diagram showing a sewage inflow prediction system according to an embodiment of the present invention.

A sewage inflow prediction data broadcast system according to the present invention will be described next with reference to FIG. 2. This sewage inflow prediction data broadcast system comprises a plurality of sewage treatment plants 6A to 6N, prediction data broadcast server 7, meteorological data providing center 8, and communication network 9.

Each of the sewage treatment plants 6A to 6N has a Web terminal formed from a computer. The sewage treatment plants 6A to 6N access the prediction data broadcast server 7 through the communication network 9 such as the Internet. The prediction data broadcast server 7 predicts the sewage inflow for each of the sewage treatment plants 6A to 6N using a predetermined black box prediction model and broadcasts the sewage inflow to the sewage treatment plants 6A to 6N through the communication network 9 such as the Internet.

The prediction data broadcast server 7 has a management section 71, model generation section 72, inflow prediction section 73, and data broadcast section 74.

The management section 71 manages the entire prediction data broadcast service. At the time of data broadcast contract, the management section 71 issues a user ID and password for each of the registrants, i.e., sewage treatment plants 6A to 6N. The management section 71 also manages registrant information including the position information of the sewage treatment plants 6A to 6N and their contact addresses. The contract may be made through the communication network 9 or offline by mail or the like.

The model generation section 72 generates/updates the prediction model for each of the sewage treatment plants 6A to 6N before broadcasting prediction data. For example, the case base generation section 53 of the sewage inflow prediction apparatus 50 shown in FIG. 1 is prepared such that the black box prediction model, i.e., the case base 54 for each of the sewage treatment plants 6A to 6N is individually generated from the historical data 30 containing the inflow data 31 obtained at each of the sewage treatment plants 6A to 6N.

Even after the adaptive learning section 55 is arranged, and the prediction data broadcast service is started, the prediction model may be updated from the historical data obtained at each sewage treatment plant.

The inflow prediction section 73 individually predicts the sewage inflow using the prediction model for each of the sewage treatment plants 6A to 6N, which is generated by the model generation section 72. For example, the similar case search section 56 and output estimation section 57 of the sewage inflow prediction apparatus 50 shown in FIG. 1 and the case base 54 for each of the sewage treatment plants 6A to 6N are arranged, and the sewage inflow for each of the sewage treatment plants 6A to 6N is predicted using a corresponding case base 54. The inflow prediction section 73 acquires the prediction condition 40 necessary for predicting the sewage inflow through the communication network 9. For example, the meteorological parameter is successively acquired from the meteorological data providing center 8 connected through the communication network 9. The historical data 30 is acquired from the sewage treatment plants 6A to 6N through the communication network 9.

The data broadcast section 74 broadcasts the prediction data to the sewage treatment plants 6A to 6N through the communication network 9. At this time, the registrant is authenticated on the basis of the user ID and password. In addition, the historical data 30 from the sewage treatment plants 6A to 6N are received and transferred to the inflow prediction section 73.

The prediction data broadcast server 7 having the management section 71, model generation section 72, inflow prediction section 73, and data broadcast section 74 is formed from at least one server apparatus formed from a computer.

[Operation of Sewage Inflow Prediction Data Broadcast System]

Figure 3:
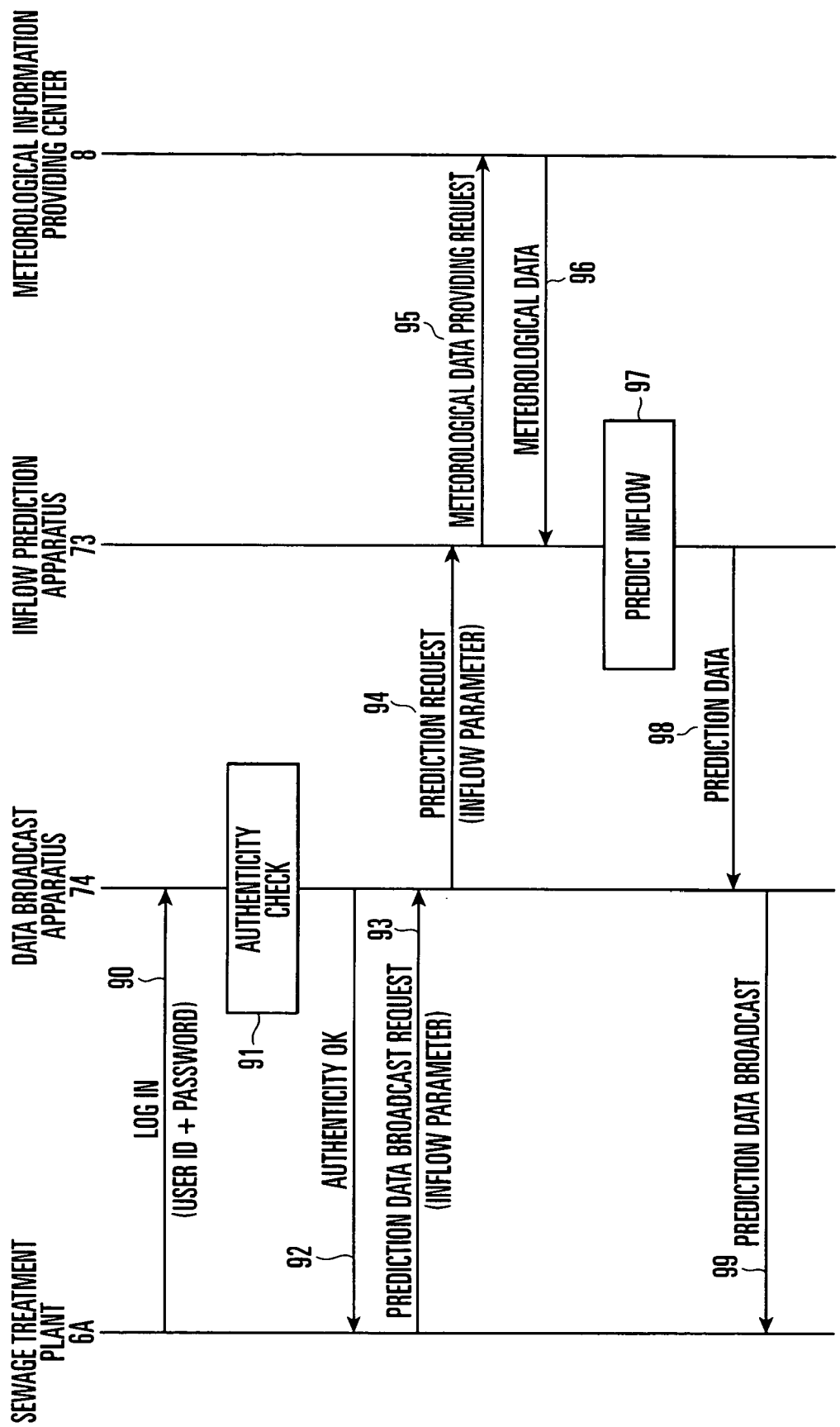
FIG. 3 is a sequence chart showing the operation of the sewage inflow prediction system.

The operation of the sewage inflow prediction data broadcast system will be described next with reference to FIG. 3. FIG. 3 is a sequence chart showing an operation example of the sewage inflow prediction data broadcast system. In the following description, assume that the sewage treatment plant 6A is registered as a registrant by the management section 71 in advance, and the prediction model for the sewage treatment plant 6A is also generated by the model generation section 72 in advance.

First, the sewage treatment plant 6A is connected to the data broadcast section 74 of the prediction data broadcast server 7 through the communication network 9 at a period of, e.g., about 20 min, as needed, to log in using the user ID and password issued at the time of data broadcast contract (step 90). The data broadcast section 74 checks the authenticity using the user ID and password (step 91). When it is confirmed that the sewage treatment plant 6A is an authentic registrant, the data broadcast section 74 sends an authentication OK notification to the sewage treatment plant 6A through the communication network 9 (step 92). Accordingly, the sewage treatment plant 6A requests broadcast of inflow prediction data and uploads the inflow parameter 41 to be used for sewage inflow prediction to the data broadcast section 74 through the communication network 9 (step 93).

In accordance with the prediction data broadcast request, the data broadcast section 74 transfers the received inflow parameter 41 to the inflow prediction section 73 together with the request to request prediction of the inflow prediction data (step 94). In accordance with the request, the inflow prediction section 73 requests the meteorological data providing center 8 through the communication network 9 to provide the meteorological parameter 43, and meteorological data herein, to be used for prediction (step 95).

The meteorological data providing center 8 broadcasts corresponding meteorological data to the prediction data broadcast server 7 through the communication network 9 in accordance with the providing request (step 96). The inflow prediction section 73 predicts the desired inflow prediction data 20 from the prediction model of the sewage treatment plant 6A under the prediction condition 40 including the inflow parameter 41 from the sewage treatment plant 6A, which is received from the data broadcast section 74, the meteorological data (meteorological parameter 43) acquired from the meteorological data providing center 8, and the time parameter 42 obtained from calendar information managed by the inflow prediction section 73 (step 97) and transfers the inflow prediction data 20 to the data broadcast section 74 (step 98).

The data broadcast section 74 broadcasts the inflow prediction data 20 from the inflow prediction section 73 to the sewage treatment plant 6A through the communication network 9 (step 99). The sewage treatment plant 6A receives the inflow prediction data 20. On the basis of the contents, an appropriate measure is taken. The prediction data broadcast server 7 executes the series of prediction data broadcast processes related to the sewage treatment plant 6A for each of the sewage treatment plants 6A to 6N.

In this way, the prediction data broadcast server 7 predicts the sewage inflow for each of the sewage treatment plants 6A to 6N using the prediction model for each of the sewage treatment plants 6A to 6N and broadcasts the prediction data to the sewage treatment plants 6A to 6N through the communication network 9 such as the Internet. For this reason, the apparatus necessary for predicting the sewage inflow need not be arranged for each of the sewage treatment plants 6A to 6N, and the facility cost can be largely reduced. In addition, the personnel expenses for prediction model generation or inflow prediction can be reduced.

The prediction data broadcast server 7 automatically acquires the meteorological parameter (meteorological data) necessary for prediction from the meteorological data providing center 8 through the communication network 9. The sewage treatment plants 6A to 6N need to send only the inflow parameter measured at the sewage treatment plant and can acquire useful inflow prediction data at a very small operation load.

[Case Base]

Figure 4:
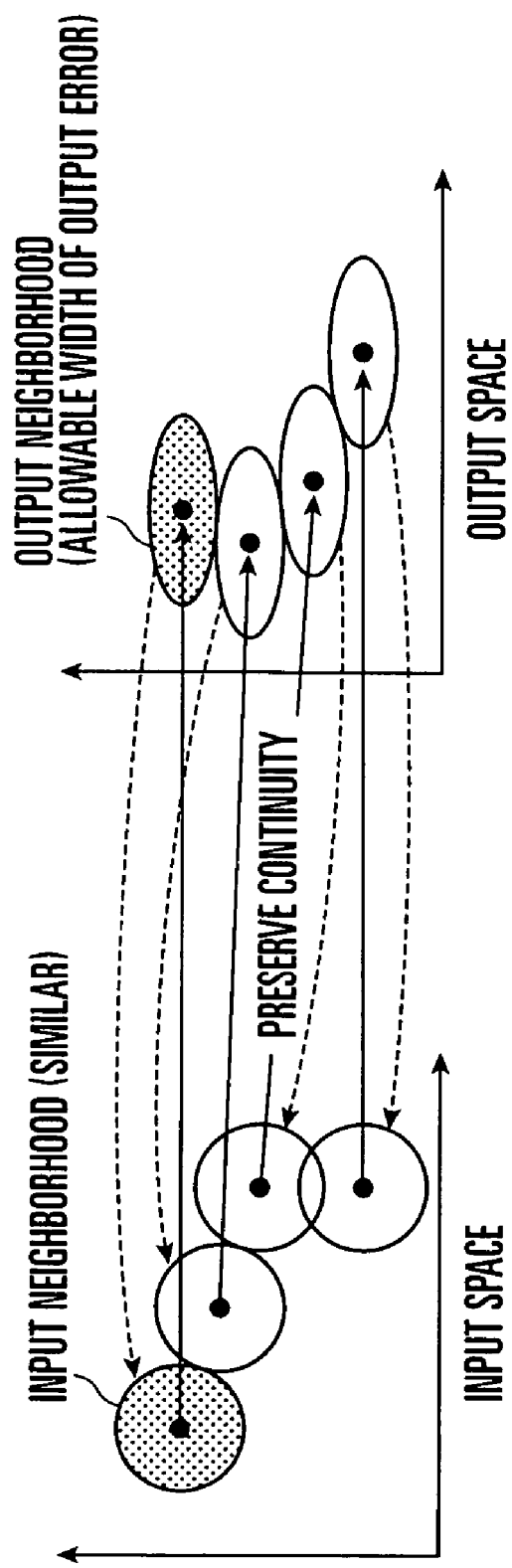
FIG. 4 is an explanatory view showing the concept of phases used in a case-based reasoning model.
Figure 5A:
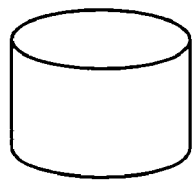
FIGS. 5A, 5B, 5C, and 5D are explanatory views showing quantization processing of an input space.
Figure 5B:
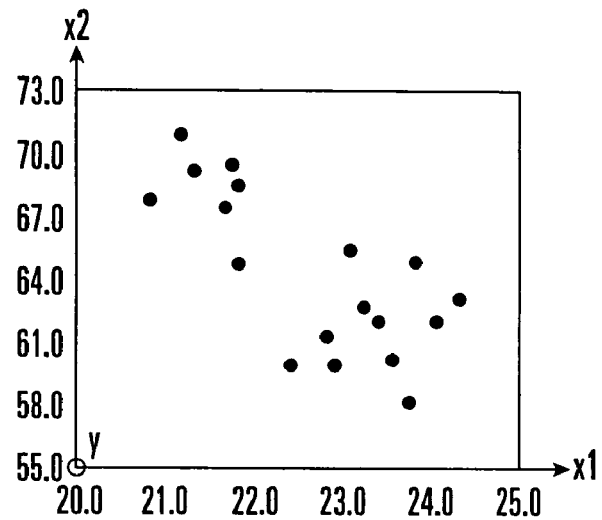
Figure 5C:
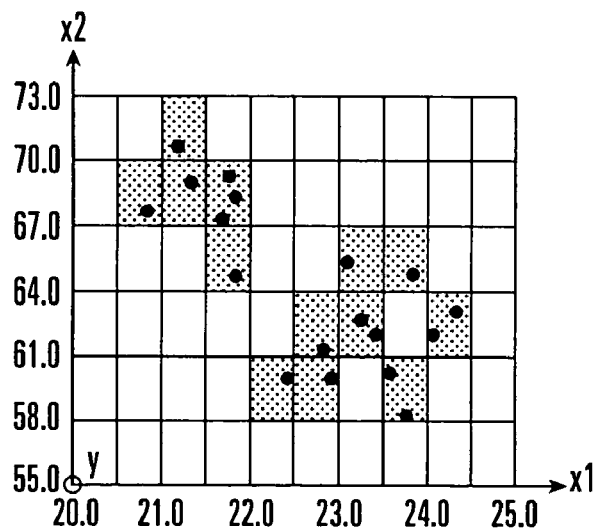
Figure 5D:
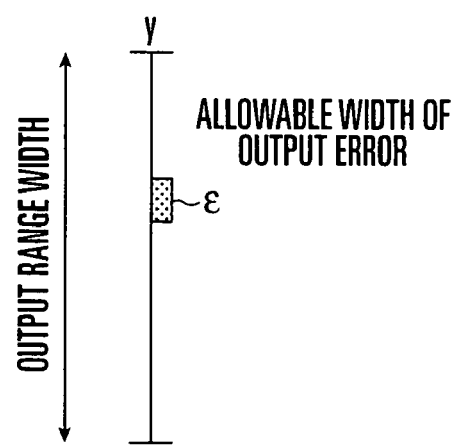

The operation of the sewage inflow prediction apparatus using the case base will be described next in detail. First, the operation of the case base generation section 53 of the sewage inflow prediction apparatus 50 will be described with reference to FIGS. 4, 5A, 5B, 5C, 5D, and 6. FIG. 4 is an explanatory view showing the concept of phases used in a case-based reasoning model. FIGS. 5A, 5B, 5C, and 5D are explanatory views showing quantization processing of an input space. FIG. 6 is a flow chart showing case base generation processing.

In the case-based reasoning model of this embodiment, an input space is quantized into a topological space on the basis of the concept of consecutive mapping in the topology of mathematics whereby the case base and similarity corresponding to an output allowable error (required accuracy) are generally defined.

The concept of consecutive mapping in the topology means that in, e.g., spaces X and Y, a necessary and sufficient condition for a consecutive mapping f: X→Y is that a reverse mapping f-1 (O) of an open set (output neighborhood) O in Y corresponds to an open set (input neighborhood) in X. Using the concept of the consecutive mapping, on the basis of a premise that the mapping f from the input space to the output space continues, an output neighborhood is defined using the allowable width of output error in the output space, as shown in FIG. 4. With this operation, the output neighborhoods can be made to correspond to input neighborhoods that satisfy the allowable widths of output errors so that the input space can be quantized and regarded as a topological space.

[Quantization of Input Space]

In this embodiment, input space quantization processing is executed as shown in FIG. 5. Historical data is formed from a combination of input data and output data obtained in the past. As shown in FIG. 5A, historical data is formed from inputs $x1$ and $x2$ and output $y$. These historical data are distributed in the input space $x1$-$x2$, as shown in FIG. 5B. When the historical data are quantized on meshes having an equal pitch and predetermined widths in the $x1$ and $x2$ directions, as shown in FIG. 5C, the size of each mesh, i.e., input quantization number is determined in consideration of an allowable width $\epsilon$ of output error, as shown in FIG. 5D.

The allowable width $\epsilon$ of output error is a value representing the degree of allowance of the error between the output obtained by estimation and an unknown true value for newly input data and is set in advance as a modeling condition. When the size of each mesh is determined using the allowable width $\epsilon$, an input neighborhood corresponding to the size of an output neighborhood, i.e., the case can be defined. The errors of output data estimated from all input data belonging to the case satisfy the allowable width $\epsilon$ of output error.

The case base generation section 53 generates the case base 54 using such input space quantization processing. Referring to FIG. 6, first, the historical data 52 is loaded (step 100). A modeling condition such as the allowable width $\epsilon$ of output error is set (step 101). Various evaluation indices are calculated on the basis of the allowable width $\epsilon$, and the input quantization number is selected for each input variable on the basis of the evaluation indices (step 102). Each case that constructs the case base 54 is generated from the historical data 52 distributed to each mesh (step 103).

Figure 8:
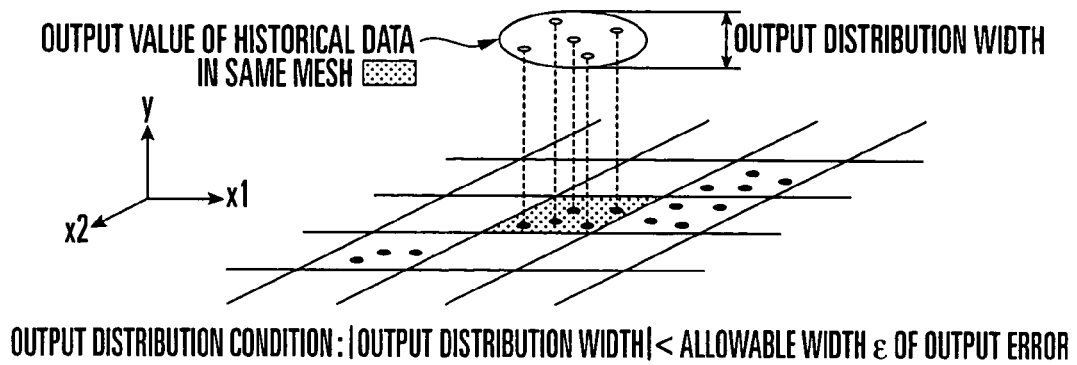
FIG. 8 is an explanatory view showing an output distribution condition.
Figure 9:
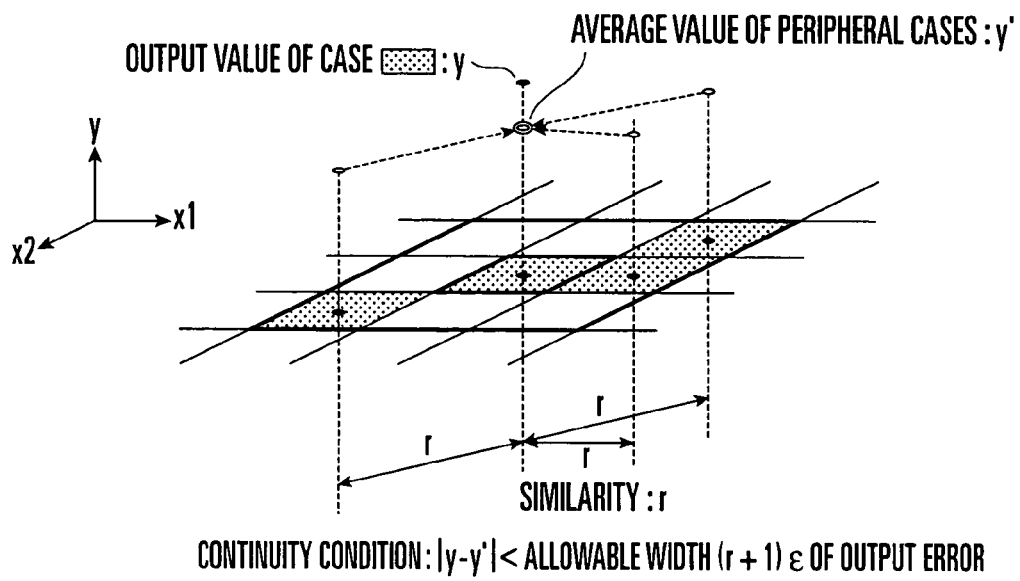
FIG. 9 is an explanatory view showing a continuity condition.
Figure 10:
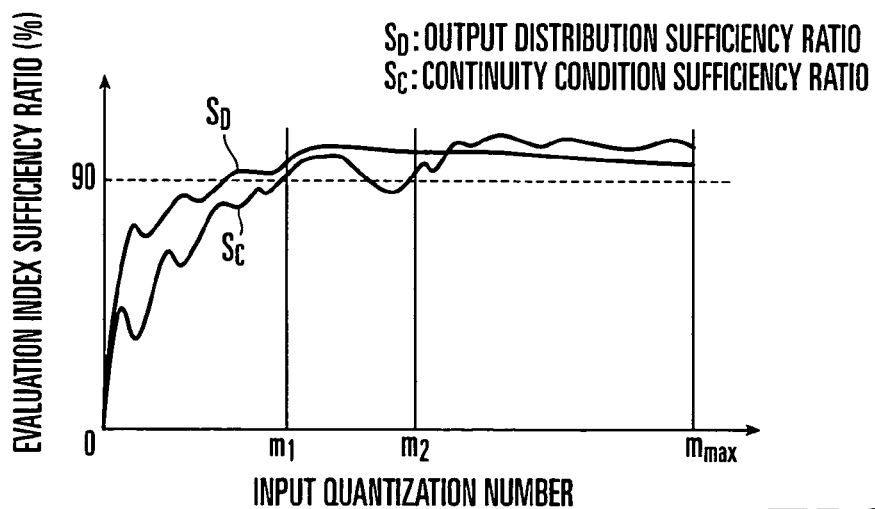
FIG. 10 is an explanatory view showing a case compression condition.

Determination processing of the input quantization number using the evaluation indices will be described now with reference to FIGS. 7, 8, 9, and 10. FIG. 7 is a flow chart showing input quantization number determination processing. FIG. 8 is an explanatory view showing an output distribution condition as one of the evaluation indices. FIG. 9 is an explanatory view showing a continuity condition as one of the evaluation indices. FIG. 10 is an explanatory view showing a case compression condition as one of the evaluation indices.

In the determination processing of the input quantization number, first, an evaluation criterion (threshold value) is set as a criterion to be used to determine whether the evaluation indices are appropriate (step 110). Each evaluation index is calculated for each input quantization number (step 111). The obtained evaluation index is compared with the evaluation criterion, and one of the input quantization numbers for which evaluation indices that satisfy the evaluation criterion is selected (step 112). As the evaluation criterion, an input quantization number for which both the output distribution condition and the continuity condition are satisfied at 90% or more is preferably selected. In the system, a divide number of 90% or 95% is indicated. The value "90%" or "95%" can statistically be regarded as an appropriate value.

The output distribution condition is a condition that for an arbitrary mesh obtained by quantizing the input space by the selected input quantization number, the output distribution width of the output y of the historical data belonging to the mesh is smaller than the allowable width $\epsilon$ of the output error, as shown in FIG. 8. It is thus checked whether one mesh, i.e., input neighborhood satisfies the condition defined for a corresponding output neighborhood, i.e., the allowable width $\epsilon$ of the output error.

The continuity condition is a condition that for an arbitrary mesh obtained by quantizing the input space by the selected input quantization number, the difference between the output value y of a case generated in the mesh and an average output value y' of peripheral cases that are present around the case is smaller than the allowable width $\epsilon$ of the output error, as shown in FIG. 9. It is thus checked whether the difference in output value between the cases, i.e., between the input neighborhoods satisfies the condition defined for a corresponding output neighborhood, i.e., the allowable width $\epsilon$ of the output error. When the continuity condition is satisfied, it can be determined that the input space is covered by the cases that continuously satisfy a desired accuracy.

The case compression condition is a condition of the compression ratio of historical data by case generation. As shown in FIG. 10, when a plurality of historical data belong to an arbitrary mesh obtained by quantizing the input space by the selected input quantization number, it means that the plurality of k historical data are compressed to 1/k and converted into one data representing the cases by case generation of the historical data. It is checked herein whether the case compression ratio of the entire historical data satisfies the allowable compression ratio designated as a modeling condition.

The input quantization number is sequentially determined for each input variable. For example, when input variables are $x1, x2, \ldots, xn$, input quantization numbers are determined sequentially for $x1$ to $xn$. To calculate an evaluation index, input quantization numbers must be assigned to all input variables. Hence, to obtain an evaluation index for $xi$, an input quantization number that has already been determined at that time is used for $x1$ to $xi-1$, and the same input quantization number as that for $xi$ is used for $xi+1, \ldots, xn$ after $xi$.

For the output distribution condition and continuity condition of the above-described conditions, the ratio of cases that satisfy the conditions to all the cases, i.e., an evaluation index sufficiency ratio is used as an evaluation index. For example, the evaluation index value of an input quantization number m for $xi$ is obtained by quantizing each of the input range widths of $x1, x2, \ldots, xn$ by a corresponding input quantization number and obtaining the ratio of cases that satisfy the evaluation index condition to all the cases generated by quantization.

For the case compression condition, the case compression ratio of the entire historical data, which is obtained by quantizing each of the input range widths of all the input variables $x1, x2, \ldots, xn$ by the corresponding input quantization number, is used as the evaluation index value for the input quantization number m for $xi$.

For the input variable $xi$, one of the input quantization numbers for which all the evaluation index values satisfy the evaluation criterion is selected and determined as the input quantization number for the input variable $xi$.

[Generation of Case Base]

Figure 11A:
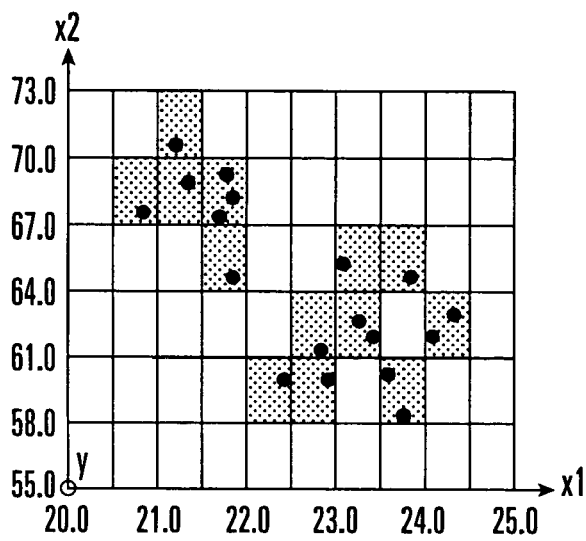
FIGS. 11A, 11B, 11C, and 11D are explanatory views showing case generation processing.
Figure 11B:
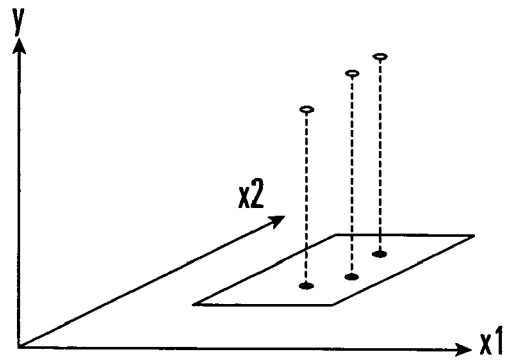
Figure 11C:
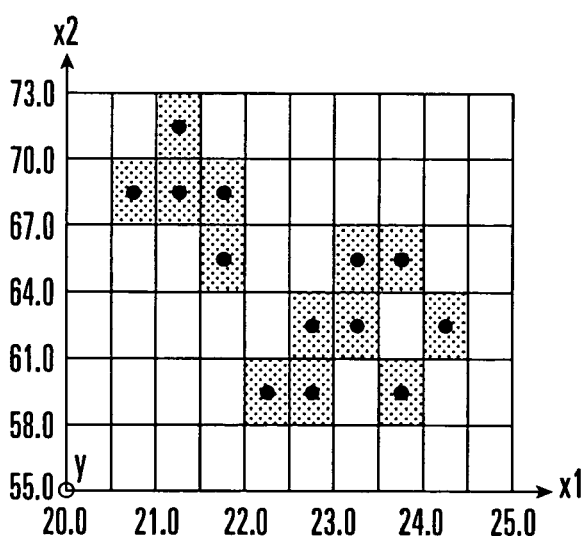
Figure 11D:
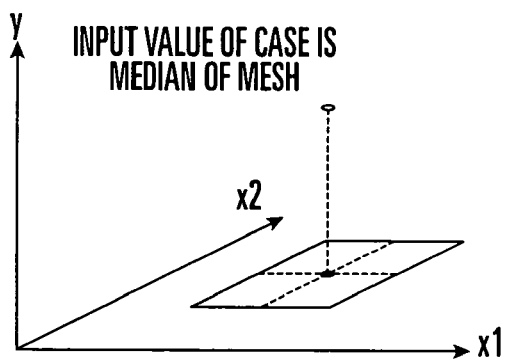
Figure 12:
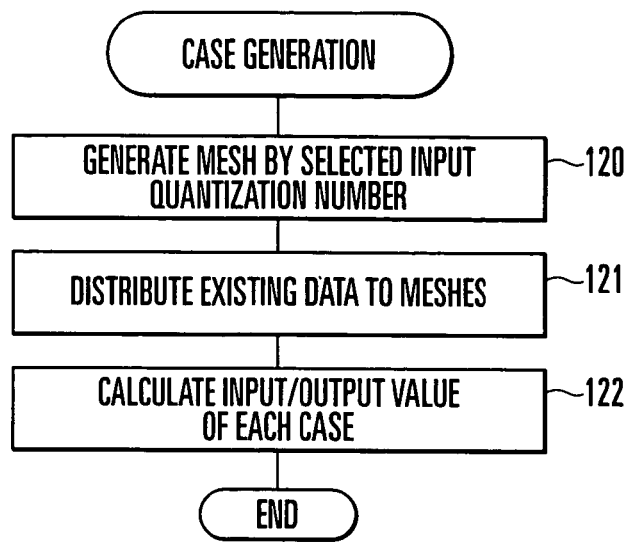
FIG. 12 is a flow chart showing case generation processing.

The case base generation section 53 selects the input quantization number in the above-described way and distributes the historical data to the input space, i.e., each mesh quantized by the input quantization number to generate cases. FIGS. 11A, 11B, 11C, and 11D are explanatory views showing case generation processing. FIG. 12 is a flow chart showing case generation processing.

First, each input variable is quantized (partitioned) on the basis of the selected input quantization number to generate a mesh (step 120). Referring to FIG. 11A, the input variable x1 is divided into 10 pieces, and the input variable x2 is divided into 6 pieces.

The historical data are distributed to the meshes (step 121). A mesh having historical data is selected as a case, and its input and output values are calculated (step 122). As shown in FIG. 11B, when three historical data are distributed to one mesh, these historical data are integrated into one case (FIG. 11C). At this time, the average value of the outputs y of the thee historical data is used as an output value that represents the case. The median of the mesh is used as an input value that represents the case (FIG. 11D).

[Estimation of Sewage Inflow]

The sewage inflow prediction apparatus 50 shown in FIG. 1 estimates the sewage inflow from the newly input prediction condition 40 using the case base 54 generated in the above-described way.

Figure 13:
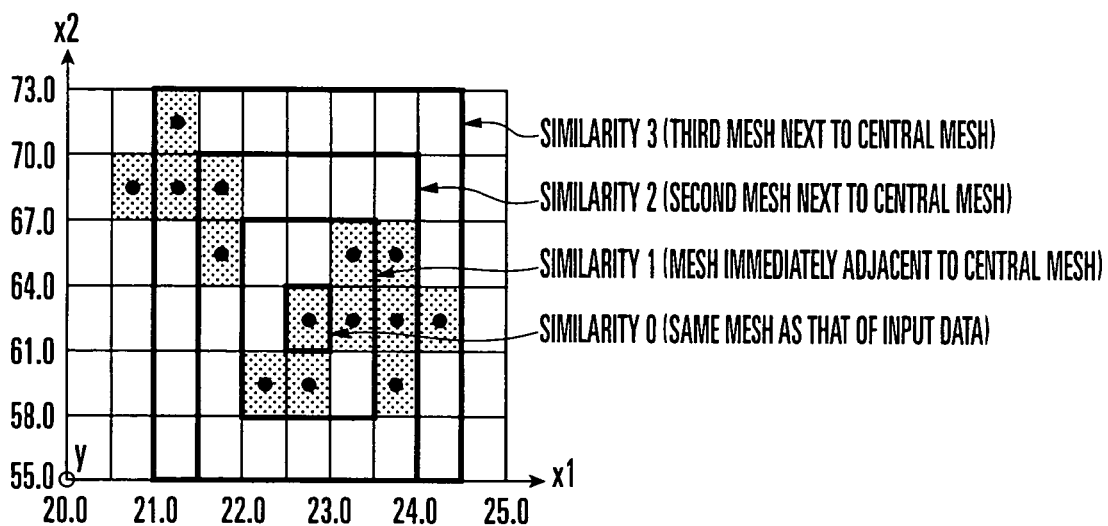
FIG. 13 is an explanatory view showing the definition of similarity.
Figure 14:
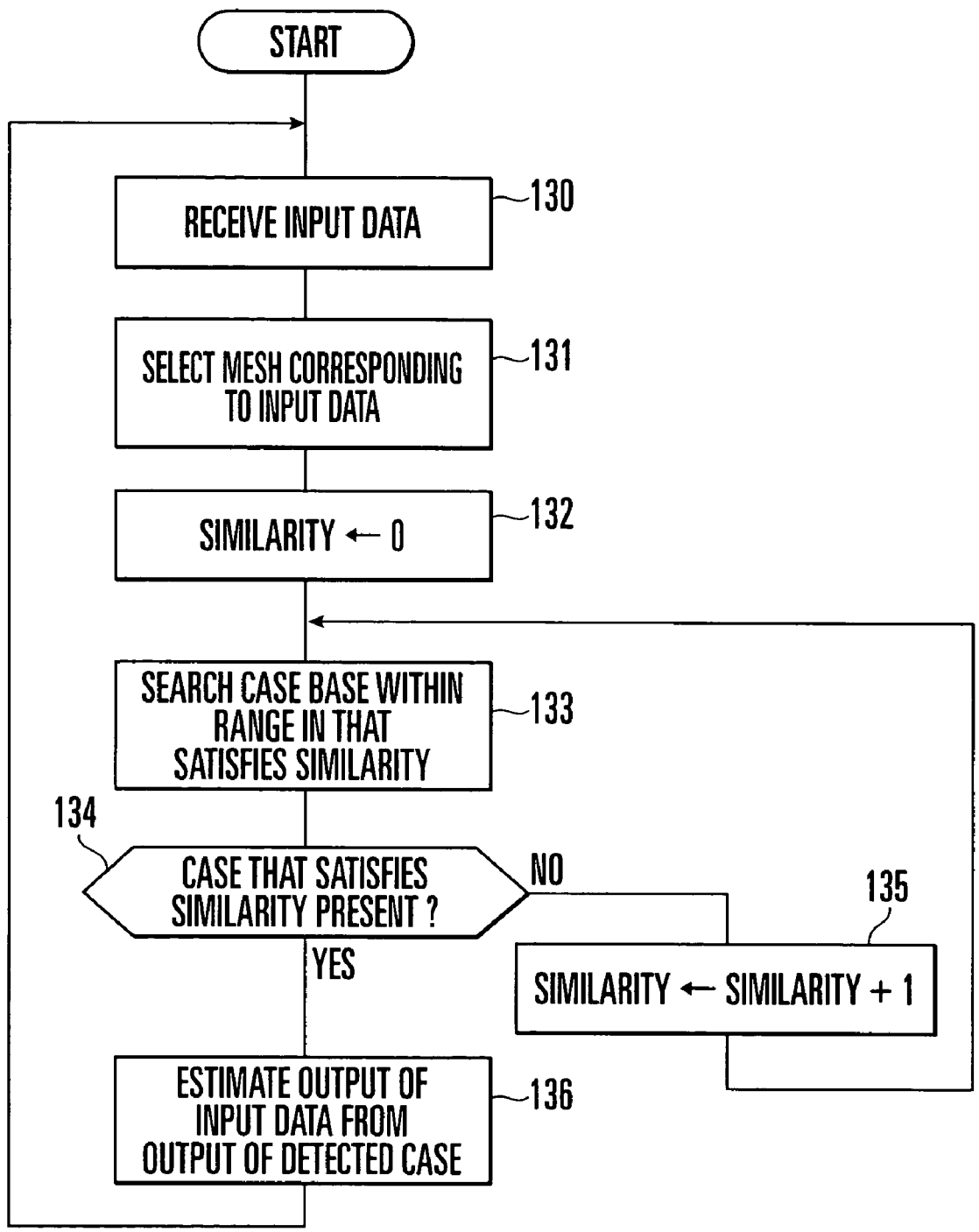
FIG. 14 is a flow chart showing similar case search processing.

First, in the similar case search section 56, the input section 51 samples the prediction condition 40 to generate input variables and searches the case base 54 for a similar case using the similarity. FIG. 13 is an explanatory view showing the definition of similarity. FIG. 14 is a flow chart showing similar case search processing in the similar case search section 56.

The similarity is an index that represents the degree of similarity between each case in each mesh formed in the input space of the case base 54 and a mesh corresponding to the new prediction condition, i.e., input data. Referring to FIG. 13, when a case is present in the central mesh corresponding to input data, the case and input data have "similarity=0". A case that is present in a mesh immediately adjacent to the central mesh has "similarity=1". As the case separates from the central mesh by one mesh, the similarity increases by one.

Hence, when estimation is performed, the estimated value by a case with a similarity i has an accuracy within (i+1)× output allowable width. At this time, when the cases on both sides are appropriately used for the input value subjected to estimation, the output value is expected to have a higher accuracy than (i+1)×output allowable width. When only the case on one side is used for the value subjected to estimation, it is expected that the accuracy is as high as (i+1)×output allowable width because of the continuity of input/output.

As shown in FIG. 14, first, the similar case search section 56 receives the new prediction condition sampled by the input section 51 as input data (step 130), selects a mesh corresponding to the input data from the input space of the case base 54 (step 131), initializes the similarity to be used as a case search range to 0 (step 132), and searches the case search range indicated by the similarity for a similar case (step 133).

When a case is present in the mesh corresponding to the input data (step 134: YES), the case is output as a similar case (step 136).

On the other hand, if no case is present in the mesh corresponding to the input data (step 134: NO), the similarity is incremented by one to widen the case search range (step 135). Then, the flow returns to step 133 to search for a similar case again.

In this way, the similar case search section 56 searches the case base 54 for a similar case corresponding to the new prediction condition. The output estimation section 57 estimates the sewage inflow corresponding to the new prediction condition on the basis of the similar case.

Figures 15A, 15B:
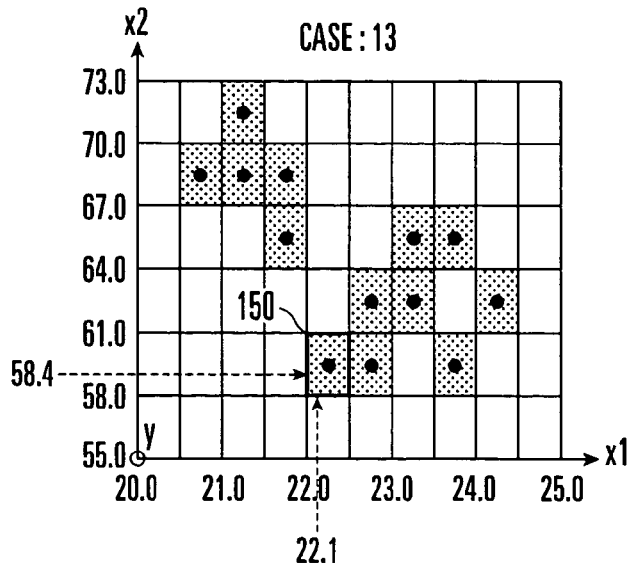
FIGS. 15A and 15B are explanatory views showing output estimation operation (when a similar case is present)

FIGS. 15A and 15B are explanatory views showing output estimation operation (when a similar case is present). For example, when a case is present in a mesh 150 corresponding to input data A (22.1,58.4) (FIG. 15A), the output value y=70.2 of the case is selected as the estimated output value (FIG. 15B).

Figures 16A, 16B:
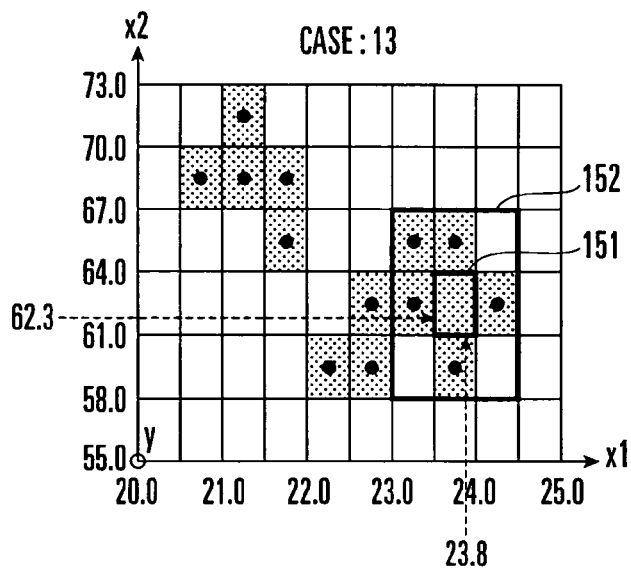
FIGS. 16A and 16B are explanatory views showing output estimation operation (when no similar case is present)

FIGS. 16A and 16B are explanatory views showing output estimation operation (when no similar case is present). When no case is present in a mesh 151 corresponding to the input data A (23.8,62.3), a search range 152 is widened, and a similar case is searched for (FIG. 16A). An estimated output value is calculated from the detected case. At this time, when a plurality of cases are detected, the average value of the output values of the cases is used as the estimated output value (FIG. 16B).

The sewage inflow corresponding to the new prediction condition 40 is estimated in this way. The inflow prediction data 20 based on the estimated amount is instructed from the output estimation section 57 to the sewage treatment plant 10.

[Adaptive Learning]

The operation of the adaptive learning section will be described next.

The adaptive learning section 55 updates the case base 54 on the basis of the new historical data 30 obtained from the input section 51. The historical data 30 may automatically be obtained every, e.g., 1 hr using a calendar function or temperature sensor such that automatic operation can be performed.

First, a case corresponding to new data is searched for from the input space of the case base 54. When a case corresponding to the new data is present, only the case is revised.

Figure 17A:
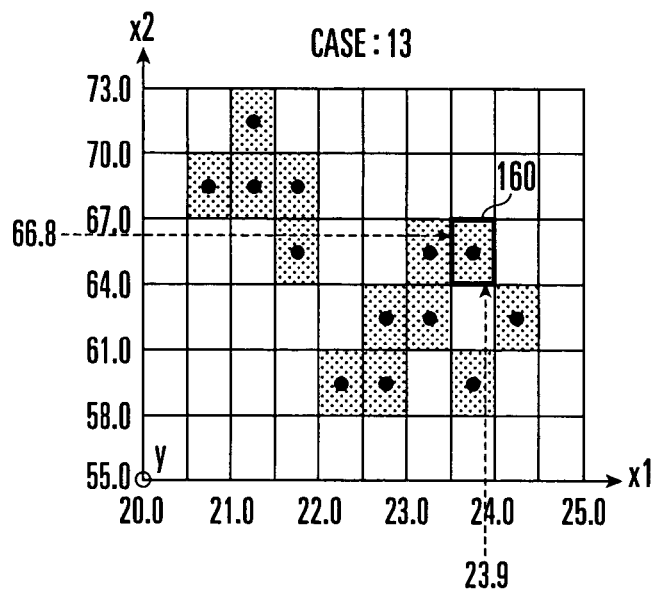
FIGS. 17A and 17B are explanatory views showing adaptive learning operation (when a corresponding case is present)
Figure 17B:
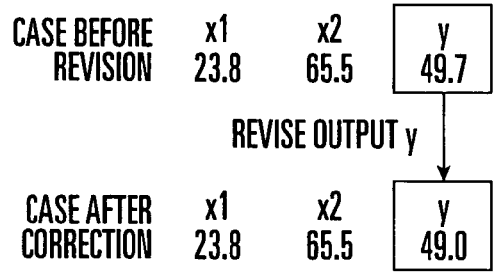

FIGS. 17A and 17B are explanatory views showing adaptive learning operation when a corresponding case is present. In this situation, since a case 160 corresponding to new data B (23.9,66.8,48.2) is present (FIG. 17A) the new output value y=49.0 of the case is output from the output value y=48.2 of the new data B and the output value=49.7 of the case 160 before revision (FIG. 17B). As an output revision expression, forgetting coefficient $C_{Forget}$ is used. An output value $Y_{old}$ 5 before revision and an output value Y of the new data B are added at the ratio indicated by the forgetting coefficient $C_{Forget}$, and an output value $Y_{new}$ of the case after revision is obtained. The output revision expression is given by $$Y_{new}(1.0-C_{Forget}) \times Y_{old} + C_{Forget} \times Y$$

On the other hand, when no case corresponding to the new data is present, a new case is generated on the basis of the new data.

Figure 18A:
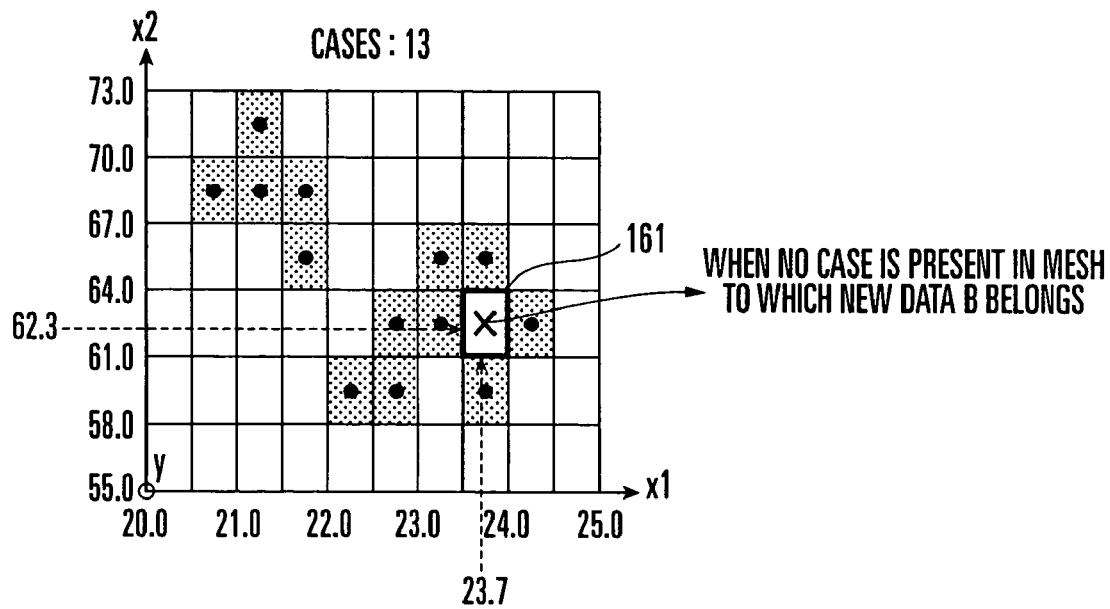
FIGS. 18A and 18B are explanatory views showing adaptive learning operation (when no corresponding case is present)
Figure 18B:
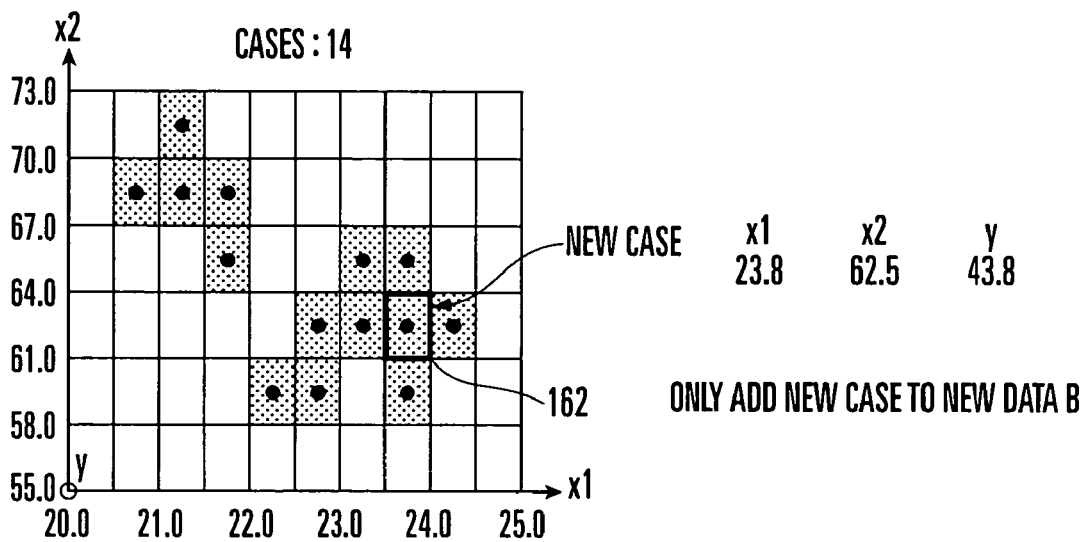

FIGS. 18A and 18B are explanatory views 15 showing adaptive learning operation when no corresponding case is present. In this situation, since no case is present in a mesh 161 corresponding to the new data B (23.7,62.3,43.8) (FIG. 18A), the median of the mesh corresponding to the new data B is used as an input 20 value. A new case 162 (23.8,62.5, 43.8) whose representative output value is the output value y of the new data B is newly generated and added to the case base 54 (FIG. 18B).

Figure 19:
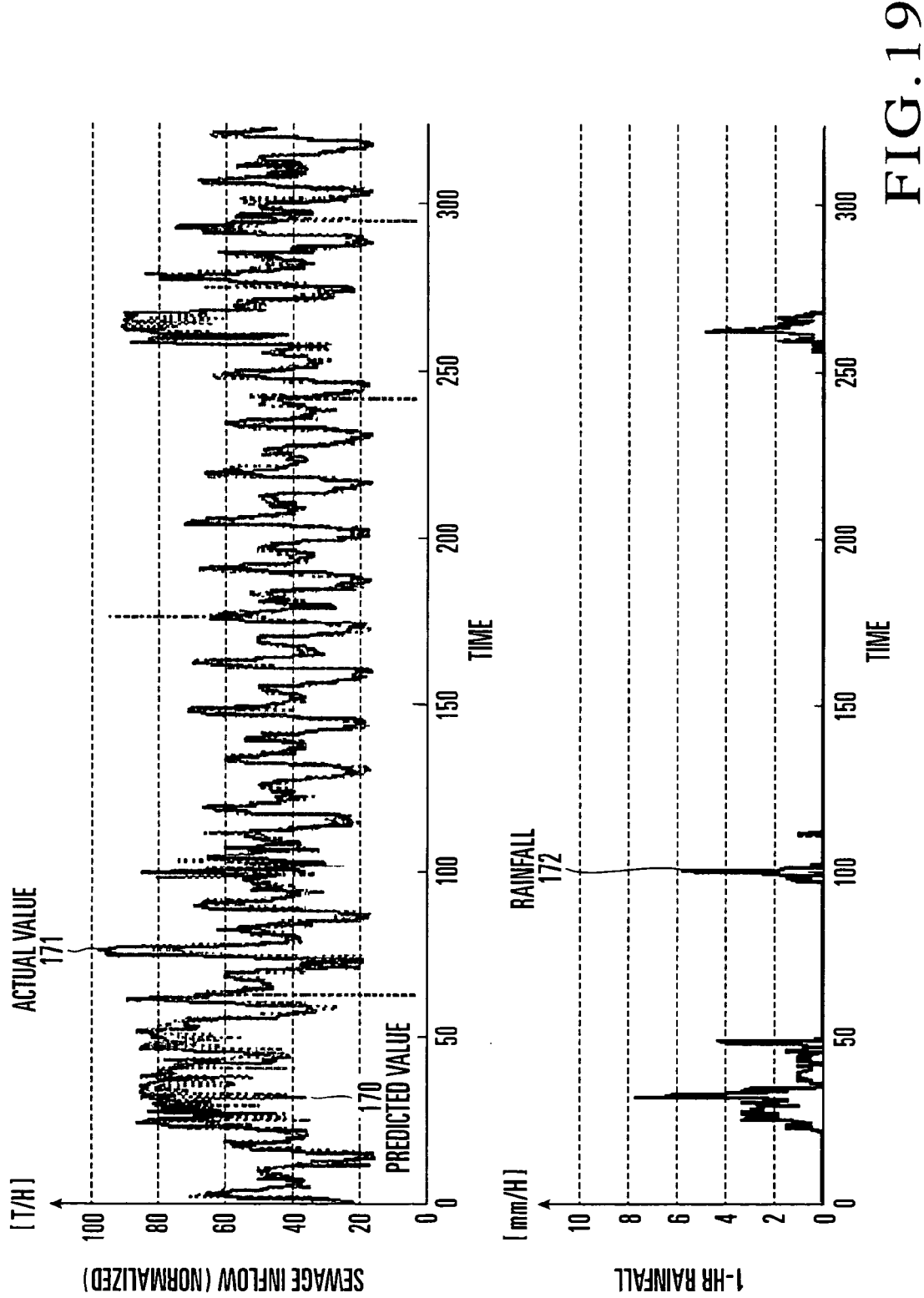
FIG. 19 is a view showing a simulation result obtained when a case-based reasoning model is used.

FIG. 19 shows a simulation result representing 25 a predicted value 170 and actual value 171 of the sewage inflow and a rainfall (1-hr rainfall) 172 when a case-based reasoning model is used. In this situation, assume that the sewage inflow at the time T1 90 min after the prediction time T0 is predicted. As the prediction condition 40, the air temperature at the time T0, the type of day at the time T1, and the time inflow for the past 1 hr, which is obtained 90 min (in this situation, at the time T0) before the time T1, are used.

As shown in FIG. 19, the obtained predicted value 170 is almost the same as the actual value 171 of the sewage inflow measured at the sewage treatment plant 10. Even when the sewage inflow changes over time, and the rainfall 172 largely changes, the predicted value 170 follows up without any delay.

[Comparison Between Case-based reasoning Model and Conventional Modeling Technique]

In the reasoning model used in the sewage inflow prediction apparatus 50, the concept of the case-based reasoning is applied to modeling. This can be said to be a modeling technique which can be applied to a general object for which the system input/output relationship maintains continuity on the basis of the concept of topology. In a general modeling technique, a model parameter such as the model order or network structure is identified. In the case-based reasoning model of this embodiment, however, a desired output allowable error is designated to identify the topology of the input space.

Hence, as a characteristic feature, data is stored in the specified input space as a case, and at the time of output estimation, the reliability of the estimated output value can be represented by the topological distance (similarity) between an input and the input case stored in advance. In this embodiment, since the sewage inflow in future is estimated using such a model, the following functions/effects can be obtained as compared to a neural network or nonlinear regression model.

In a neural network or nonlinear regression model:

1) Since a special model structure is used to specify the relationship in the entire input/output region, a long time is required to find a structure optimum for the system.

2) To learn a large quantity of historical data, convergence calculation must be performed to identify the plurality of parameters of the model structure. This also takes a long time.

3) Even when a model is updated on the basis of new data, the parameters must be identified, and therefore, adaptive learning is difficult in fact.

4) It is difficult to grasp the degree of reliability of the model output value for the input value to be estimated.

To the contrary, according to the above embodiment:

1) Since cases (questions and answers) that are experienced in the past are stored as the case base, and input/output cases that involve the input/output relationship of the system are used, no special model for representing the input/output relationship is necessary.

2) For a newly input question, an existing case having a similar question is searched for from the case base. At this time, the input space is quantized using an input quantization number as a parameter to define the case base and similarity. The quantization number is determined by calculating an evaluation index value. For this reason, no convergence calculation is necessary. In addition, the degree of completion of the model can be evaluated on the basis of the evaluation index value. Unlike the conventional technique, the model need not be evaluated using independently test data.

Also, according to the above embodiment:

3) The answer of a detected similar case is corrected to obtain the answer for the newly input question. Since the degree of similarity of the case detected for the input value to be estimated can be determined, the similarity can be used to evaluate the reliability of the output value.

4) After the correct answer for the newly input question is obtained, the new case is added to the case base. Hence, the case base can be partially revised on the basis of the new data. Parameter identification as in the conventional technique is unnecessary, and adaptive learning can easily be executed.

The problem of learning and convergence calculation in the conventional model is equivalent to the problem of definition of the case-based structure and similarity in the case-based reasoning (CBR). In the conventional case-based reasoning, it is a serious engineering problem; definition is impossible unless sufficient information of an object is present. In the case-based reasoning model of the above embodiment, the first definition of the case base and similarity according to the output allowable error, i.e., requested accuracy is done on the basis of the concept of consecutive mapping in the topology of mathematics by quantizing the input space into a topological space.

As has been described above, according to the sewage inflow prediction apparatus of the above embodiment, a prediction model is generated from historical data containing inflow data that indicates the sewage inflow measured at the sewage treatment facility and meteorological data corresponding to the inflow data. The sewage inflow corresponding to an input prediction condition is predicted in real time. For this reason, the sewage inflow prediction apparatus has a practical operability and can predict the inflow in future at a sufficient reliability in consideration of the time required for sewage purification treatment. Hence, as compared to the prior art that predicts using formulas based on physical laws, prediction can be executed using a relatively small number of variables. Rough city design information need not be used.

In addition, in the sewage inflow prediction apparatus and server apparatus, a prediction data broadcast server connected to each sewage treatment facility through a communication network receives an inflow parameter that indicates a sewage inflow newly measured at any one of the sewage treatment facilities from the sewage treatment facility through the communication network, acquires meteorological data corresponding to the inflow parameter, through the communication network as a meteorological parameter, from a meteorological data providing center that provides meteorological data, predicts the sewage inflow corresponding to a prediction condition including the inflow parameter and meteorological parameter in real time using the prediction model of the sewage treatment plant, and broadcasts inflow prediction data obtained by prediction to the sewage treatment facility through the communication network.

Hence, in addition to the above effects, the apparatus necessary for predicting the sewage inflow need not be arranged for each sewage treatment facility, and the facility cost can be largely reduced. Furthermore, the personnel expenses for prediction model generation or inflow prediction can be reduced.

Also, the prediction data broadcast server automatically acquires the meteorological parameter (meteorological data) necessary for prediction from the meteorological data providing center through the communication network. The sewage treatment facility side needs to send only the inflow parameter measured at the sewage treatment plant and can acquire useful inflow prediction data at a very small operation load.

The invention claimed is:

1. A sewage inflow prediction apparatus which provides sewage inflow prediction for a sewage treatment facility comprising:

a case base generated from historical data including inflow data that indicates a sewage inflow previously measured at the sewage treatment facility and meteorological data corresponding to the inflow data; and prediction means for detecting a substantially similar case corresponding to an input prediction condition from said case base and predicting a sewage inflow on the basis of the detecting result in real time, wherein first inflow data that indicates a sewage inflow measured at a first time and second inflow data that indicates a sewage inflow measured after a predetermined prediction time from the first inflow data are used as the inflow data, meteorological data corresponding to the second inflow data is used as the meteorological data, an inflow parameter that indicates a sewage inflow newly measured at the sewage treatment facility and a meteorological parameter obtained by meteorological prediction are used as a prediction condition, said case base has a plurality of input spaces, which are quantized in accordance with a desired output allowable error, the first inflow data and meteorological data included in historical data and at least one representative case is provided for each of the input spaces, the case base has an output value that represents at least one historical data arranged in at least one space of the plurality of input spaces on the basis of an input variable value, said prediction means searches the case base for detecting a substantially similar case corresponding to a new prediction condition as an input variable value and estimates inflow prediction data corresponding to the new prediction condition using an output value of the detected substantially similar case, the sewage inflow prediction is not created in advance based on physical laws, the sewage inflow prediction is used by the sewage treatment facility to control sewage purification treatment, and when a plurality of historical data are distributed on one input space of the plurality of input spaces, an average value of outputs of the plurality of historical data is used as an output value of the at least one representative case and a median of one input space is used as an input value of the at least one representative case.

2. The sewage inflow prediction apparatus according to claim 1, wherein air temperature and rainfall in an objective region of the sewage treatment facility are used as the meteorological data.

3. The sewage inflow prediction apparatus according to claim 1, further comprising:

adaptive learning means for modifying the case base, said adaptive learning means using as input a combination of third inflow data that indicates a sewage inflow newly measured at the sewage treatment facility, fourth inflow data that indicates a sewage inflow measured before a predetermined prediction time for the third inflow data, and meteorological data corresponding to the third inflow data, wherein said adaptive learning means modifies an output value of a predetermined case of a case base corresponding to the fourth inflow data and meteorological data on the basis of the third inflow data.

* * * * *